United States Patent
Sams et al.

(10) Patent No.: US 7,814,371 B2
(45) Date of Patent: Oct. 12, 2010

(54) APPARATUS AND METHOD FOR POINT-TO-POINT INTERCONNECT TESTING

(75) Inventors: David Sams, Columbia, SC (US); Ronald T. Anderson, Lexington, SC (US)

(73) Assignee: Intel Corporation, Santa Clara, CA (US)

(*) Notice: Subject to any disclaimer, the term of this patent is extended or adjusted under 35 U.S.C. 154(b) by 1050 days.

(21) Appl. No.: 11/528,969

(22) Filed: Sep. 27, 2006

(65) Prior Publication Data

US 2008/0074992 A1    Mar. 27, 2008

(51) Int. Cl.
*G06F 11/00* (2006.01)

(52) U.S. Cl. ......................................... 714/43

(58) Field of Classification Search .................. 714/43, 714/700
See application file for complete search history.

(56) References Cited

U.S. PATENT DOCUMENTS

| | | | |
|---|---|---|---|
| 6,006,073 A * | 12/1999 | Glauner et al. ........... 455/67.11 |
| 6,009,488 A | 12/1999 | Kavipurapu |
| 6,748,212 B2 * | 6/2004 | Schmutz et al. ............. 455/424 |
| 6,885,209 B2 * | 4/2005 | Mak et al. .................... 324/763 |
| 6,986,091 B2 * | 1/2006 | Moore et al. ................. 714/738 |
| 7,231,560 B2 * | 6/2007 | Lai et al. ..................... 714/712 |
| 2004/0036494 A1 * | 2/2004 | Mak et al. .................... 324/763 |

* cited by examiner

*Primary Examiner*—Robert Beausoliel
*Assistant Examiner*—Amine Riad
(74) *Attorney, Agent, or Firm*—Blakely, Sokoloff, Taylor & Zafman LLP

(57) ABSTRACT

A method and apparatus for point-to-point interconnect testing are described. In one embodiment, the method includes the determination of an expected behavior of a point-to-point link according to initial link training/configuration values of the link. The expected link behavior is determined according to link behavior during initial link configuration. A respective test value may be driven on at least one lane of the link to emulate lane break/degradation conditions during retraining of the link in response to a link reset. In one embodiment, an actual behavior of the link may be determined according to the behavior of the link during retraining of the link as lane break/degradation values are driven over the link. In one embodiment, a lane break/degradation condition is detected if the expected link behavior does not match the actual behavior of the link. Other embodiments are described and claimed.

17 Claims, 11 Drawing Sheets

APPARATUS AND METHOD FOR POINT-TO-POINT INTERCONNECT TESTING

FIELD

One or more embodiments of the invention relate generally to the field of integrated circuit and computer system design. More particularly, one or more of the embodiments of the invention relates to a method and apparatus for point-to-point interconnect testing.

BACKGROUND

During the past decade, peripheral component interconnect (PCI) has provided a very successful general purpose input/output (I/O) interconnect standard. PCI is a general purpose I/O interconnect standard that utilizes PCI signaling technology, including a multi-drop, parallel bus implementation. Unfortunately, traditional multi-drop parallel bus technology is approaching its practical performance limits. In fact, the demands of emerging and future computing models exceed the bandwidth and scalability limits that are inherent in multiple drop, parallel bus implementations.

Meeting future system performance needs requires I/O bandwidth that can scale with processing and application demands. Fortunately, technology advances in high speed point-to-point interconnects are enabling system designers to break away from the bandwidth limitations of multiple drop, parallel buses. To this end, system designers have discovered a high-performance, third generation I/O (3GIO) interconnect that will serve as a general purpose I/O interconnect for a wide variety of future computing and communications platforms.

PCI Express comprehends the many I/O requirements presented across the spectrum of computing and communications platforms and rolls them into a common scalable and extensible I/O industry specification. The PCI Express basic physical layer consists of a differential transmitter pair and a differential receiver pair. As such, dual simplex data on these point-to-point connection, referred to herein as a "point-to-point link," is self-clocked, for such point-to-point (P2P) links, bandwidth increases linearly with interconnect (link) width and frequency. In addition, PCI Express also provides a message space within its protocol that is used to implement legacy side band signals. As a result, a further reduction of signal pins produces a very low pin count connection for components and adapters.

Unfortunately, the use of a differential transmitter and receiver pair is a drastic deviation from traditional PCI. As a result, many link mode combinations are now possible, thus creating new and challenging complexities for validation of such interfaces.

Furthermore, as point-to-point link speeds increase, it becomes more difficult to guarantee operation of the link by simply writing a link specification. Link-based systems such as those based on PCI-E and, for example, common system interconnect (CSI), have a link training mechanism where for example, the transmitter transmits a "compliance pattern." As described herein, a compliance pattern refers to a sequence of bits that characterize the transmitter to generate the worst case eye diagram. Link training, may further include negotiated link widths, link speed and other like link configuration information. Hence, merely providing a link specification does not ensure correct operation of point-to-point links.

BRIEF DESCRIPTION OF THE DRAWINGS

The various embodiments of the present invention are illustrated by way of example, and not by way of limitation, in the figures of the accompanying drawings and in which:

FIG. 4 is a chart illustrating an example of lane break conditions for a four lane (×4) point-to-point link, in accordance with one embodiment.

FIG. 5 is a chart illustrating a second example of implementation following a lane break condition for a ×4 link, in accordance with one embodiment.

DETAILED DESCRIPTION

A method and apparatus for point-to-point interconnect testing are described. In one embodiment, the method includes the determination of an expected behavior of a point-to-point link according to, for example, one or more an initial link training/configuration values of the link. The expected link behavior can be determined following configuration of the link. In one embodiment, a respective test value may be selected for one or more lanes of the point-to-point link according to an initial link width value. A respective test value may be driven on at least one lane of the link to emulate lane break/degradation conditions during retraining of the link in response to a link reset.

In one embodiment, an actual behavior of the link may be determined according to the behavior of the link during retraining of the link as lane break/degradation values are driven over the link. In one embodiment, a lane break/degradation condition is detected if the expected link behavior does not match the actual behavior of the link. In one embodiment, a lane break/degradation condition is detected if at least one initial link train value does not match a corresponding reset link training value, as determined following retraining of the link while driving lane break/degradation values on one or more lanes of the link.

In the following description, numerous specific details such as logic implementations, sizes and names of signals and buses, types and interrelationships of system components, and logic partitioning/integration choices are set forth to provide a more thorough understanding. It will be appreciated, however, by one skilled in the art that the invention may be practiced without such specific details. In other instances, control structures and gate level circuits have not been shown in detail to avoid obscuring the invention. Those of ordinary skill in the art, with the included descriptions, will be able to implement appropriate logic circuits without undue experimentation.

Figure 1:
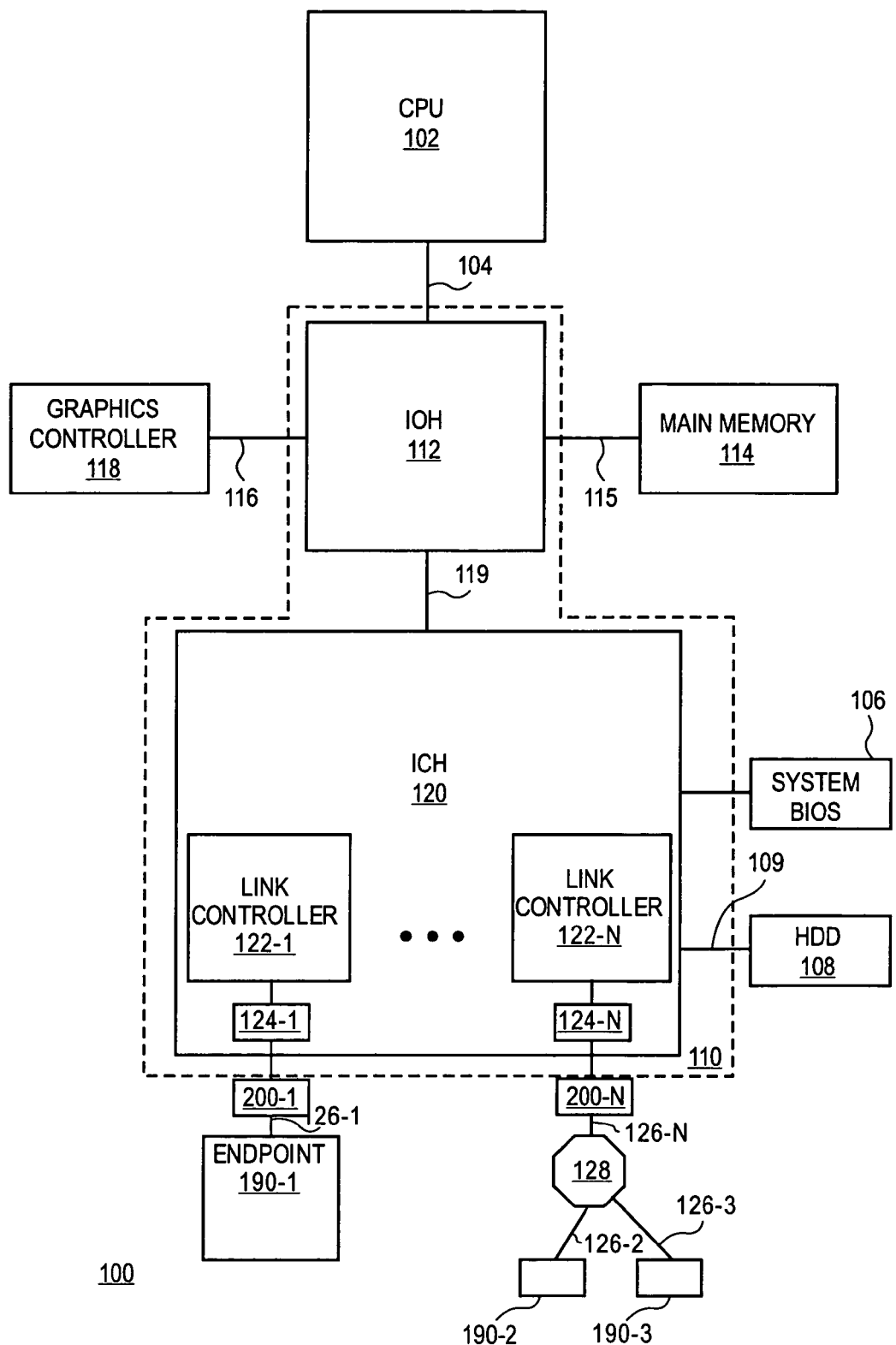
FIG. 1 is a block diagram illustrating a computer system including link test logic for testing of a point-to-point link, in accordance with one embodiment.

FIG. 1 is a block diagram illustrating computer system 100 including link test logic 200 to support testing of point-to-point links, in accordance with one embodiment. Representatively, computer system 100 comprises a processor system bus (front side bus (FSB)) 104 for communicating information between processor (CPU) 102 and chipset 110. As described herein, the term "chipset" is used in a manner to collectively describe the various devices coupled to CPU 102 to perform desired system functionality. In one embodiment, CPU 102 may be a multi-core chip multiprocessor (CMP).

Figure 11:
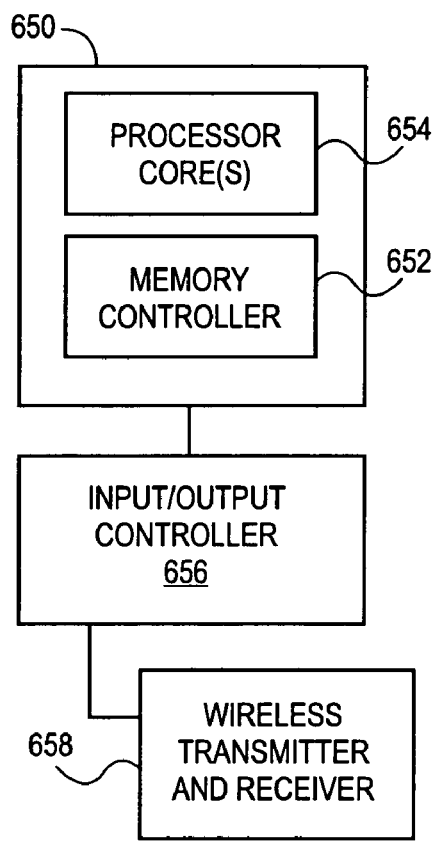
FIG. 11 is a block diagram illustrating a computer system according to any of the above described embodiments including a multi-core processor having an embedded memory controller according to one embodiment.
Figure 12:
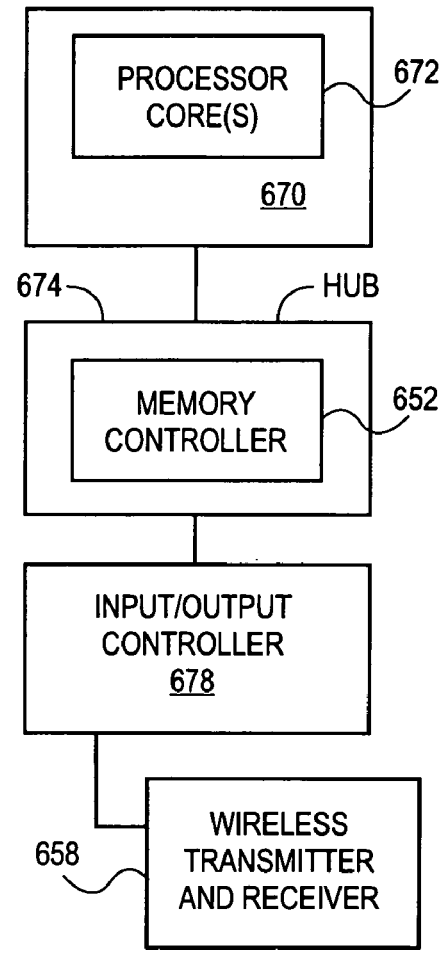
FIG. 12 is a block diagram illustrating a computer system according to any of the above described embodiments in which a memory controller is including in a hub chip according to one embodiment.

Representatively, chipset 110 may include an input/output hub (IOH) 112 coupled to graphics controller 118 via interconnect 116. In an alternative embodiment, IOH includes a memory controller, as shown in FIG. 12. In one embodiment, a memory controller is integrated into CPU 102, as shown in FIG. 11. In the alternative embodiment, graphics controller 118 is integrated into IOH 112, such that, in one embodiment, IOH 112 operates as an integrated graphics memory controller hub (GMCH). Representatively, IOH 112 is also coupled to main memory 114 via interconnect 115. In one embodiment, main memory 114 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

As further illustrated, chipset 110 includes an input/output (I/O) controller hub (ICH) 120. Representatively, ICH 120 may include a serial advance technology attachment (SATA) 109 to couple hard disk drive devices (HDD) 108 to ICH 120. In one embodiment, basic input/output system (BIOS) 106 initializes computer system 100. Although chipset 110 is illustrated as including a separate IOH 112 and ICH 120, in one embodiment, IOH 112 may be integrated within CPU 102. In an alternate embodiment, the functionality of IOH 112 and ICH 120 are integrated within chipset 110. In one embodiment, IOH 112 and ICH 120 are integrated within CPU 102 to provide a system on chip.

Figure 2:
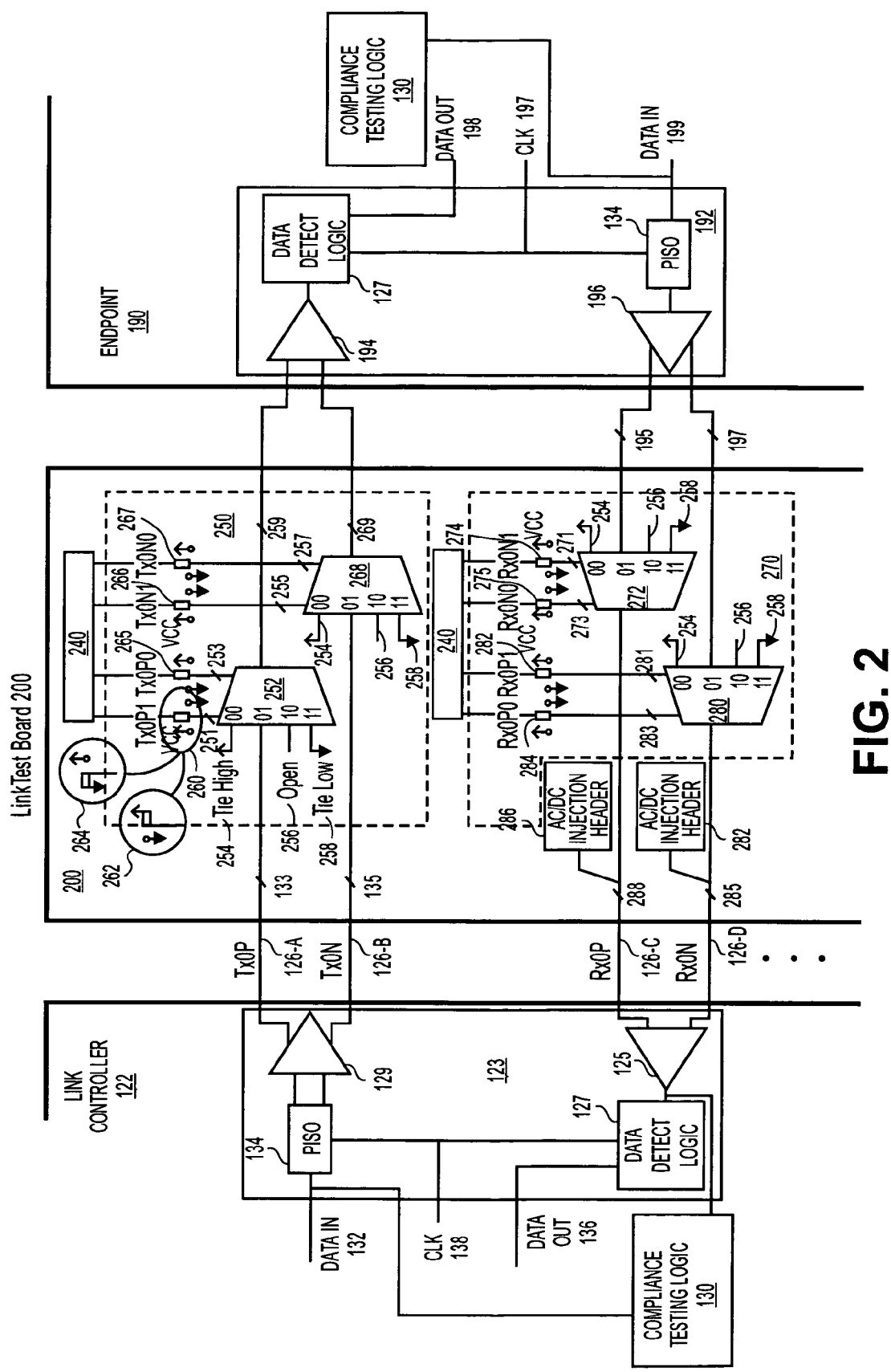
FIG. 2 is block diagram further illustrating a point-to-point link including the link test logic of FIG. 1, in accordance with one embodiment.
Figure 3:
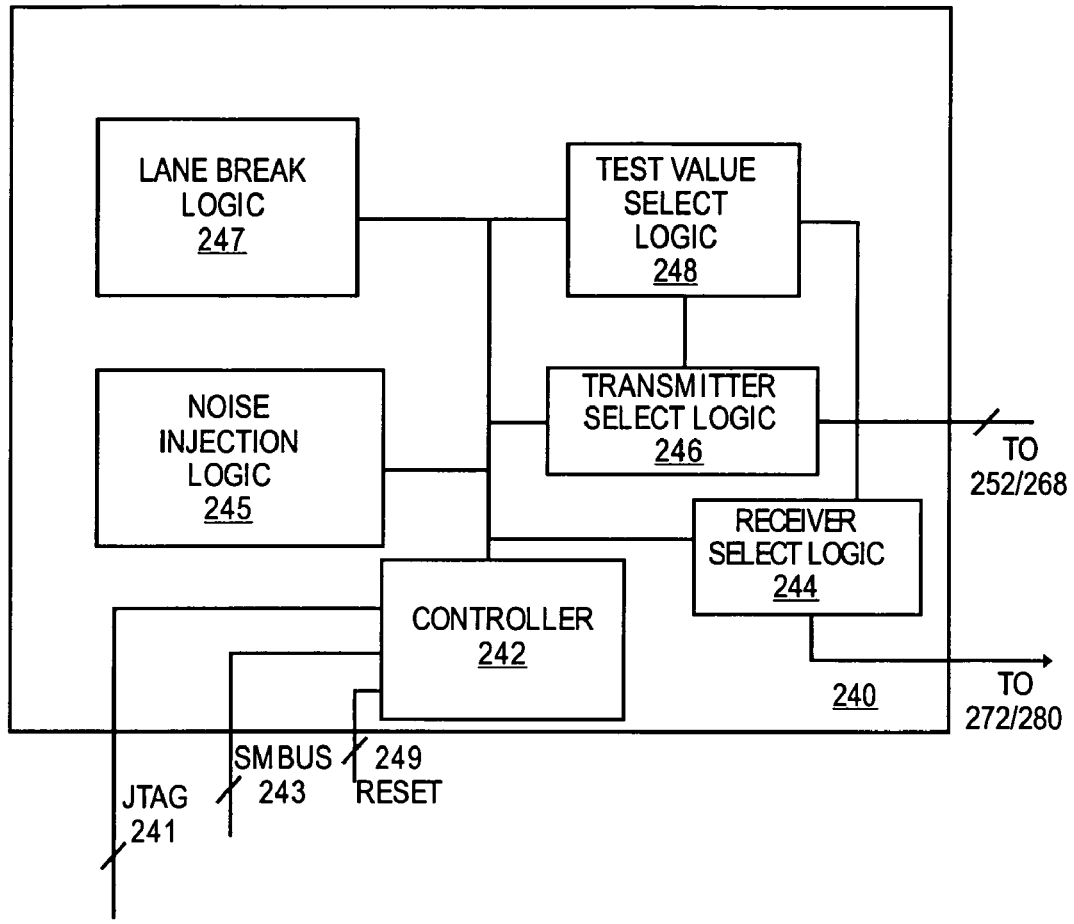
FIG. 3 is block diagram further illustrating link test logic of FIG. 2, in accordance with one embodiment.

In one embodiment, link test logic 200, for example, as shown in FIGS. 2 and 3, is provided to subject compliance testing of point-to-point links 126 to lane break and degradation conditions, in accordance with one embodiment. In one embodiment, link test logic 200 subjects link initialization and training of point-to-point links 126 to lane break and degradation conditions to identify link tolerance to lane break/degradation conditions, in accordance with one embodiment.

As described herein, lane break/degradation conditions may include but are not limited to forcing the following lane break/degradation values on any signal pair of a transceiver or receiver of differential lane including, but not limited to, a tie high value (level for a programmable duration); a tie low (level or programmable duration); an open or floating value such a tri-state value, a short value as well as other like testing values to emulate lane break conditions. In conjunction with the emulating of lane break conditions, lane degradation conditions may be emulated over link 126, including but not limited to, the injection of noise onto the lanes of the point-to-point link using for example an alternating current (A/C)/direct current (DC) (AC/DC) injection header.

In one embodiment, link test logic 200 may be implemented within computer systems including an MCH integrated within a CPU, an MCH and ICH integrated within a chipset, as well as a system on-chip. Accordingly, those skilled in the art recognize that FIG. 1 is provided to illustrate one embodiment and should not be construed in a limiting manner. In one embodiment, ICH 120 includes link controllers 122 (122-1, 122-2, . . . , 122-N) for controlling one or more point-to-point links 126 (126-1, 126-2, . . . , 126-N).

In one embodiment, point-to-point links 126 may support a point-to-point link protocol including, but not limited to, common system Interface (CSI), peripheral component interconnect (PCI) Express (PCI-E) or other like point-to-point interconnect. Accordingly, although one or more of the embodiments described herein may be provided with reference to PCI-E, those skilled in the art should recognize that the embodiments described herein are not limited to point-to-point links, which support PCI-E, and are therefore applicable to other like point-to-point link protocols.

Accordingly, in one embodiment, links 126 may provide a point-to-point link, such as defined by PCI Express Base Specification 1.0a (Errata dated 7 Oct. 2003) to allow bi-directional communication between peripheral endpoint devices 190 (190-1, . . . , 190-N). Representatively, ICH 120 may include peripheral component interconnect PCI-E root ports 124 (124-1, . . . 124-N) to couple links 126 to link controllers 122 of ICH 120, referred to herein as the "fabric".

Representatively, peripheral endpoints 190-2 and 190-3 are coupled to link 126-N via interconnects 126-3 and 126-4, respectively, and via switch 128. Consequently, endpoints 190-2 and 190-3 are required to arbitrate for ownership of link 126-N to issue transactions. Such arbitration is required since endpoints 190-2 and 190-3 are generally not allowed to simultaneously drive link 126-N. As described herein, an endpoint that is requesting data is referred to as a "requester." Likewise, an endpoint from which data is requested is referred to as a "completer." As further described herein, a device coupled to a point-to-point link may be referred to herein as a "link device."

In one embodiment, link test logic 200 may be provided in the form of a PCI Express add-on card including a PCI-E straddle mount slot and PCI-E edge connector. In one embodiment, link test logic 200 is comprised of a test board which may be coupled between a root complex (e.g., chipset 110) and an end point. In one embodiment, link test logic 200 imposes noise or drives a predetermined value on the lanes of links 126. The predetermined values may includes but are not limited to high, low, tri-state values to emulate various lane break and degradation conditions over link 126.

As further illustrated in FIG. 1, an endpoint 190 may be directly coupled to a link controller 122 of ICH 120 via link 126. Representatively, endpoint 190-1 is directly coupled to link controller 122-1 via link 126-1. Although the embodiments described herein may be provided with reference to examples wherein the point-to-point links couple peripheral endpoint device 126 to chipset 110, those skilled in the art should recognize that the embodiments described herein may be provided to test any point-to-point links, such as, for example, common serial interface (CSI) of FSB 104 for coupling chipset 110 to CPU 102.

FIG. 2 is a block diagram further illustrating link test logic 200 according to one embodiment. Representatively link test logic 200 is provided as a plug-in card. In one embodiment, link test logic 200 is provided as a plug-in board coupled between a root complex, such as chipset 110 including link controller 122, and endpoint 190, for example, as shown in FIG. 1. Link test logic 200 may include control logic 240 to select the various values which are driven on the lanes of a point-to-point link according to one embodiment.

As shown in FIG. 2 further illustrates link testing logic 200, which couples link controller 122 to endpoint 190 according to one embodiment. Representatively, point-to-point link 126 represents a dual simplex communications channel between a transceiver 123 of link controller 122 and a transceiver 192 of endpoint 190. Point-to-point link 126, as shown in FIG. 2, includes two low voltage, differentially driven signal pairs, a transmit pair ($T_xOP$ 126-A and $T_xON$ 126-B) and a receive pair ($R_xOP$ 126-C and $R_xON$ 126-D). As illustrated, link 126 includes transceiver 123, having driver and receiver pair 129 and 125, and transceiver 192 having receiver and driver pair 194 and 196. In addition, a data clock 138/197 is embedded using an 8B/10B encoding scheme to achieve increased data rates.

In one embodiment, the transmitter lane pair 126-A and 126-B and receiver lane pair 126-C and 126-D may be implemented utilizing one of an AC coupled line and a DC terminated line. In an alternate embodiment, the transceiver 126-A and 126-B and receiver lane pair 126-C and 126-D may be implemented utilizing one of a DC coupled and a DC terminated line with a common mode voltage of zero. In one embodiment, the definition of the 8B/10B transmission code is identical to that specified in ANSI X3.230-1994, clause 11 (and also IEEE 802.3Z, 36.2.4, July 1998).

Referring again to link test logic 200, in the embodiment illustrated, link test board 200 may include transmit test value selection logic 250 for driving selected lane break/degradation values on transmit lane pair 126-A and 126-B. In addition, link test board 200 includes receive test value selection logic 270 for driving selected lane break/degradation values on receiver lane pair 126-C and 126-D to emulate lane break/ degradation degradation conditions on link 126. As further shown in FIG. 2, control logic 240 provides control of transmit and receive test value selection logic 250 and 270 to provide a user programmed or statically configured value on transmit lane pair 126-A and 126-B and receive lane pair 126-C and 126-D.

Representatively logic selection devices 252 and 260 of transmit value selection logic 250, which are for example multiplexers, are used to drive a selected lane break/degradation value 259/269 on a lane of link 126 including transmit pair 126-A and 126-B. As shown in FIG. 2, link test logic 200 includes control logic 240 to select one of the various lane break/degradation values to be driven on the point-to-point link. In the embodiment illustrated, a selected lane break/ degradation values may include, but are not limited to tie high value 254, data value 133, open value 256 and tie low value 258.

In one embodiment, link test logic 200 includes jumpers 260, 265, 266 and 268 which may be manually set to provide a tie high value 262, a tie low value 264, such that logic selection devices 252 and 268 are set to configure to a high value or a low value according to the manual setting of jumpers 260, 265, 266 and 268. In an alternative embodiment, control logic 240 provides selection values 251/253 and 255/ 257 to drive the selected lane break/degradation value on the lane of point-to-point link 126.

As further shown in FIG. 2, logic selection devices 272 and 280 receive value selection logic 270, are provided to drive a selected test value on a receiver pair lane (126-C and 126-D) of the point-to-point link 126. In one embodiment, selection of the lane break/degradation values for logic selection devices 272 and 282 is analogous to the transmit test value selection logic 250 and determined by control logic 240 according to signals 271 and 273 and 281 and 283, corresponding to the logic selection devices 272 and 280, respectively. In one embodiment, lane break/degradation value selection is manually determined according to setting of jumpers 284, 282, 274 and 275.

In the embodiment illustrated, alternating current (AC)/ direct current (DC) (AC/DC) injection headers 282 and 286 are coupled to receive lane pairs 126-C and 126-D to inject noise onto receive lane pair 126-C and 126-D of link 126. In one embodiment, injection headers 286 and 288 are provided to subject link 126 to degradation conditions, and may also be coupled to transmit lane pair 126-A and 126-B. In one embodiment, the matching of an expected behavior to actual behavior of link 126 during link retraining (with lane break/ degradation values being driven over the link) indicates a degree of tolerance to lane break/degradation conditions.

In one embodiment, AC/DC injection headers 282 and 286 may be implemented by using external dip switches (jumpers) to control the lanes onto which noise is injected. In one embodiment, injection headers 282 and 286 may be implemented using resister taps to inject noise onto, for example, receiver lane pair 126-C and 126-D of link 126 to emulate lane degradation conditions over link 126.

FIG. 3 is a block diagram further illustrating control logic 240 of FIG. 2 according to one embodiment. In one embodiment, control logic includes controller 242 to control noise injection logic 245 and lane break logic 247. Control logic 242, in one embodiment, is programmable under software control with the lane break/degradation mode independently controlled for each lane. In one embodiment, a system management bus (SMB) is provided as a programming interface 243 to enable the selection by controller 242 to direct test value select logic 248 to drive the programmed lane break/ degradation value.

In an alternative embodiment, an update to provide a selected test value to controller 242 is provided with, for example, a joint test action group (JTAG) link 241. As further illustrated in FIG. 3, transmitter select logic 246 and receiver select logic 244 are directed by test value select logic 242 to select the value to be driven by transmitter logic selection devices 252 and 270. Similarly, receiver select logic 244 generates the value driven by receiver logical devices 272 and 280. As indicated above, in an alternative embodiment, the capability to set the mode of each lane statically is provided via external dip switches (jumpers) such as jumpers 260, 265, 266, 268, 284, 282, 275 and 274 as shown in FIG. 2.

Referring again to FIG. 2, compliance testing logic 130 may be comprised of a link training and status state machine (LTSSM) for example is defined by PCI-E. In one embodiment, as part of link initialization, controller 242 of control logic 240, as shown in FIG. 3, may issue a reset to the LTSSM of compliance testing logic 130 in response to reset signal 249. As described herein, link initialization and training is a physical layer control process that configures and initializes a device as physical layer, port and associated link, so that normal packet traffic can be processed on the link. This process may automatically be initiated after reset without any software involvement.

A subset of a link training and initialization process, referred as "link retraining," is initiated automatically as a result of a wake-up from a low power mode or due to an error condition that renders the link inoperable. In one embodiment, compliance testing logic 130 may cause link 126 to retrain. During retraining of link 126, LTSSM may direct link 126 to enter a configuration state which may establish a link width value, lane ordering and other link configuration/training values. Prior to the configuration state, bit and symbol lock should be established, a link data rate determined and polarity corrections made on incoming data if necessary.

In one embodiment, an expected behavior of the link may be determined once a link has completed configuration and training and operates according to a normal (L0) run state. During such L0 run state, the expected behavior of the link may be based on one or more initial link training/configuration values, such as an initial link width value, an initial lane ordering value or other like configuration/training value. In one embodiment, selected lane break/degradation values may be determined for driving such values on the desired lanes of the point-to-point link to emulate lane break/degradation conditions over the link. During the driving of such lane break/degradation values over the link, a secondary reset of a secondary bus may be forced to cause link retraining.

During the link retraining, the link is subjected to the driving of the various lane break/degradation values, and/or injected noise, to emulate lane break or degradation conditions to determine an actual behavior of the link under the lane break/degradation conditions. The initial link training values may provide provides an expected behavior and may be compared with corresponding reset link training values which provides an actual behavior of the link following retraining of the point-to-point link under lane break or degradation conditions. Matching initial link training values (expected behavior) with corresponding a link training values (actual behavior,) following link retraining, illustrates a degree of tolerance of the link to lane break/degradation conditions.

Referring again to FIG. 2, in one embodiment, transceiver 123 and transceiver 192 include data detect logic 127. In one embodiment, data detect logic 127 receives a fast training sequence (FTS) ordered set, which may be sampled to determine edge placement to perform phase adjustment for data detect logic 127. In one embodiment, a phase adjusted value may provide a sample clock for data detect logic 127 to position the sample data clock to incoming data and align the sample data clock with a data eye of the incoming data to establish bit lock. Subsequently, data synchronization is achieved once a simple synchronization is completed.

In one embodiment, noise injection results in degradation of a data eye to prohibit/degrade bit lock, resulting an increase of the chance of random bit errors. In one embodiment, a behavior of a receiver in the presence of random intermittent errors is determined as an actual behavior of the receiver chip, which may be compared to unexpected behavior of the receiver chip. In one embodiment, an amount of noise required to cause bit errors may be quantified. In one embodiment, an amount of noise below a predetermined value indicates that a link is operating just above a failure level (because the amount of injected noise on the link required to cause errors was minimal.) Alternatively, if the amount of noise is above the predetermined value, the link is very robust (since a substantial amount of noise injection amplitude is required to induce failure.)

In one embodiment, an expected behavior of the link (in the absence of noise) may be compared to the actual behavior of the link (in the presence of the noise) to determine noise injection tolerance of the link. In one embodiment, the noise injection tolerance of a link may be viewed as one parameter to indicate the relative electrical health (quality of a receiver) for a link. In one embodiment, noise injection for determining noise injection tolerance of the link is performed during an L0 (normal) operation state, and not during link retraining testing. Accordingly, in one embodiment, noise injection is turned off during link training such that once link training achieves the L0 or normal operation state, noise injection may be gradually increased until bit errors are detected on the link.

Figures 4, 5:
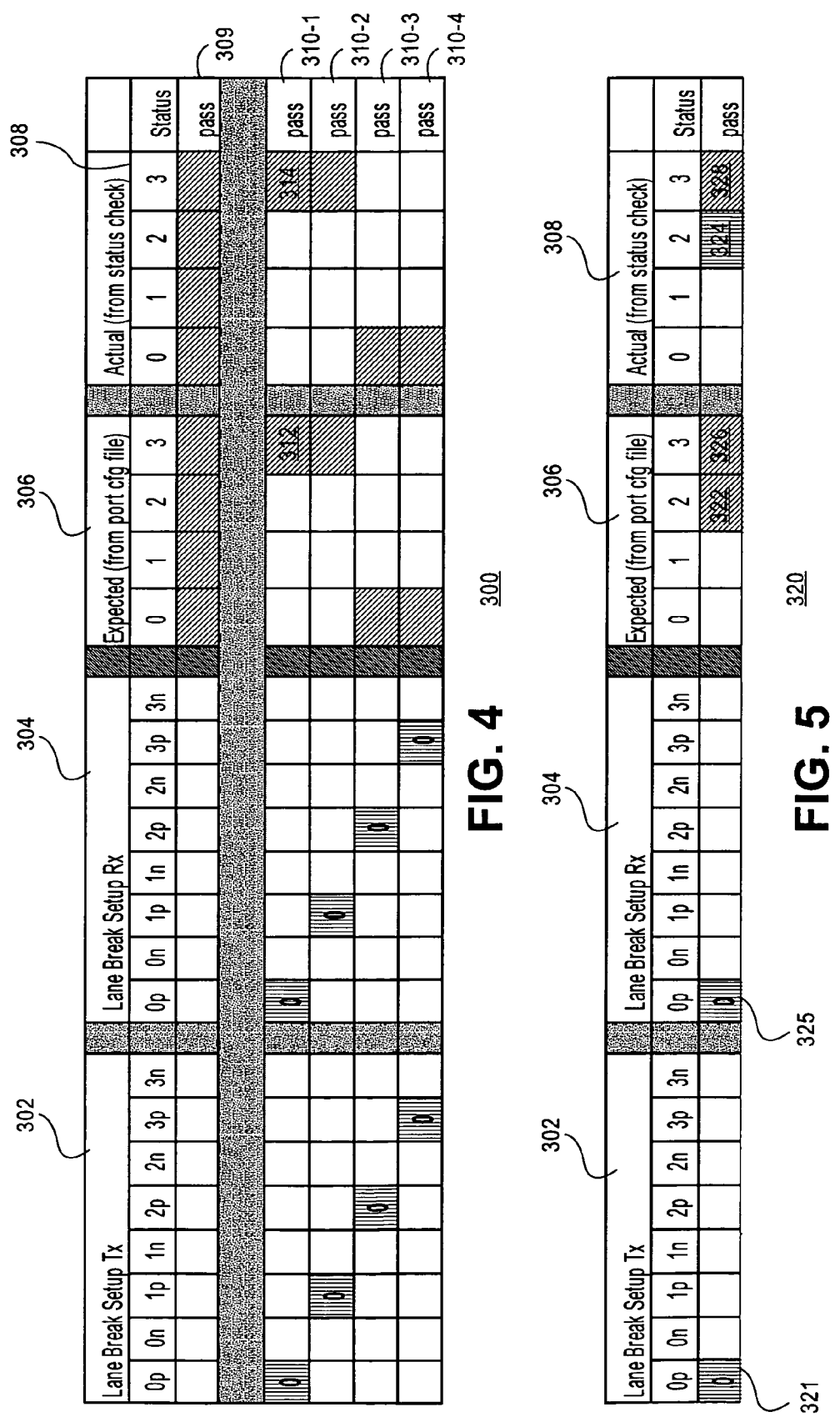

FIG. 4 is a chart 300 illustrating various lane break conditions of a four lane (×4) link according to one embodiment. As shown in FIG. 4, chart 300 includes section 302 which illustrates a lane break setup for a transmit pair. Similarly, section 304 indicates a lane break setup for a receiver pair. In addition, section 306 indicates an expected behavior of the link as determined according to initial training of the link. Conversely, section 308 indicates an actual behavior of the link as determined during retraining of the link under lane break and degradation conditions.

Accordingly, the embodiments describe that a baseline or expected behavior of a link may be determined according to behavior of the link during initial training of the link in the absence of lane break and degradation conditions. Such expected behavior may be determined according to various configuration values generated by the link during retraining, such as a configuration state. One or more of the embodiments describe the use of a link width value to determine an actual behavior of a link as compared to an expected behavior of the link based on the link width value following retraining of the link. However, it should be recognized that the use of the link width value provides one possible example which may be used to identify an expected behavior of a link and provided as a comparison to the actual behavior of the link during retraining of such link under lane break and degradation conditions. Accordingly, the expected and actual behaviors of a link may be determined according to additional configuration or link training values, while remaining within the scope of the described embodiments.

As shown in FIG. 4 an ×4 link (four differential transmit lanes, and four differential receive lanes) is shown. Representatively first section 309 shows conditions where no lane pairs are broken during retraining of the link under lane degradation and lane break conditions. As shown in section 306, columns 0-3 illustrate the individual lanes that are expected to train. As shown in section 308, the actual columns 0-3 indicate the lanes that actually do train. In the embodiment shown, a software application or the like should indicate a pass as a condition where the actual link width meets an expected link width.

As further illustrated in FIG. 4, section 310 (301-1, 310-2, 310-3 and 310-4) illustrates breaks on transmit and receive, lanes 0-1, as indicated by hatches with an O. The expected link width in this case would be an ×1 width, with a link training in lane 3. In other words, as shown by entry 312 of section 310-1, lane 3 is expected to train. As shown in entry 314 of section 310-1 the actual behavior of the link matches the expected behavior. If the link actually trains on lane 3 this would be considered a passing case. Sections 310-2-310-4 illustrate further examples.

FIG. 5 is a chart 320 illustrating lane break conditions for an ×2 link, according to one embodiment. In the embodiment illustrated in FIGS. 4 and 5, it should be understood that the example chart are device dependent. In other words, what holds true for one device under test (DUT) may not hold true for another. Therefore, depending on the degree of degraded mode capability that is has been designed into the link such link may pass various lane break and degradation conditions. For example, as shown in FIG. 5, an expected link width from a device should form an ×2 link on upper two lanes (2 and 3). If the actual link only trained to ×1 on lane 3, as indicated by hatches 324 and 328 then the test should be considered a failure (i.e., under the prescribed lane break scenario, the link did not train as an expected ×2 link width, see hatches 322 and 326).

Figure 6:
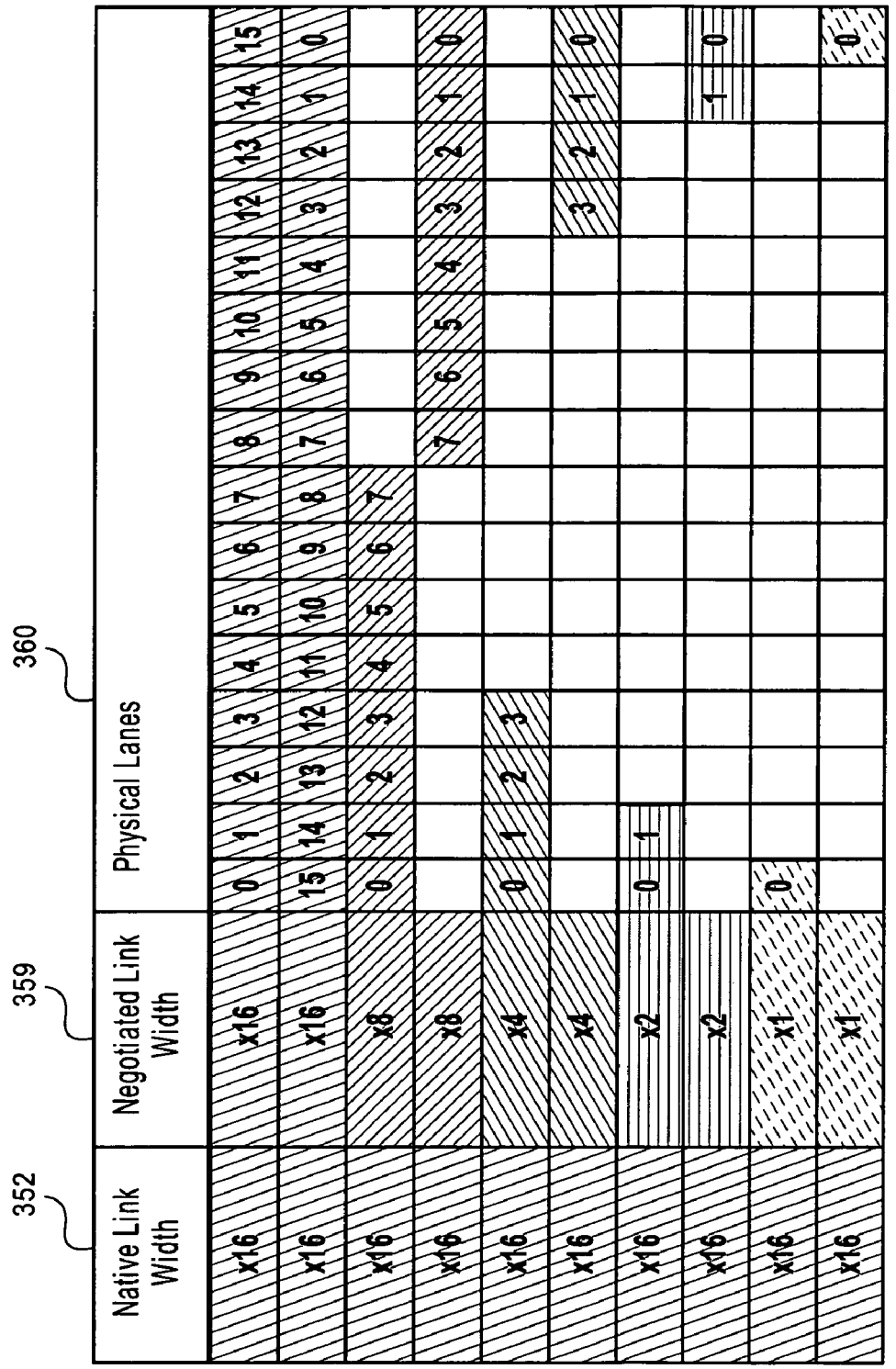
FIG. 6 is a chart illustrating an example of expected behavior for a sixteen lane (×16) point-to-point link, in accordance with one embodiment.

FIG. 6 illustrates a chart 350 for an ×16 link. As shown in FIG. 6, although the link testing logic can provide a generic method to break lanes, the supported behavior is very much product dependent. As shown in FIG. 6, physical lanes 360 illustrate the expected behavior for an ×16 device from vendor A. This particular device can support an ×16 native width in both forward (0→15) and reverse (15→0) mode. It is also capable of degrading to an ×8 (see column 352) link on either the upper or lower eight lanes, an ×4 link on the upper of the lower four lanes on the like. The device behavior as shown in FIG. 6 can be coded at expected behavior in the above examples. Various lanes can then be broken, and the actual behavior (352) compared to the expected behavior (see column 350) to determine product compliance to designed behavior. Procedure methods for implementing one or more embodiments are now described.

Figure 7:
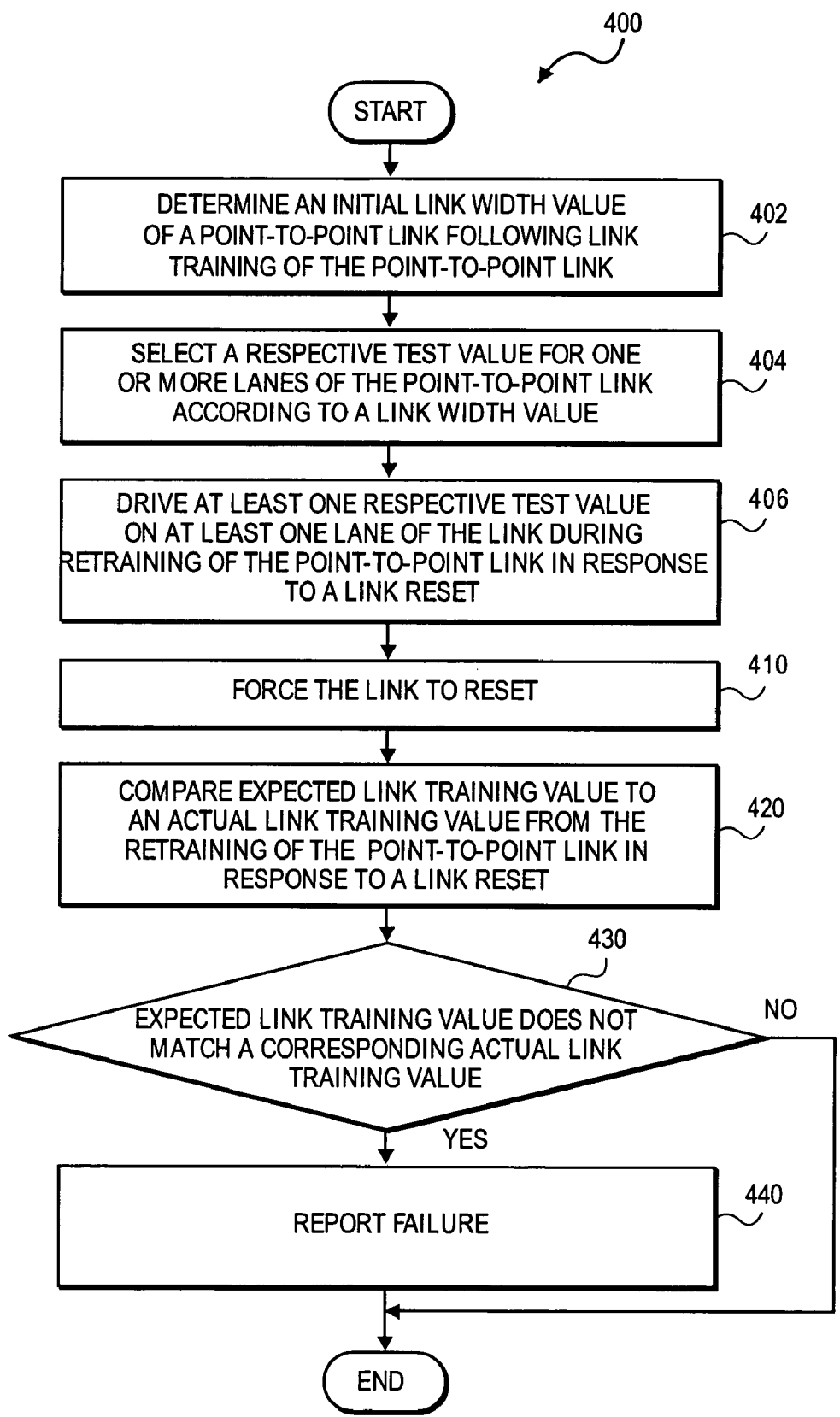
FIG. 7 is a flowchart illustrating a method for lane break testing of a point-to-point link, in accordance with one embodiment.
Figure 8:
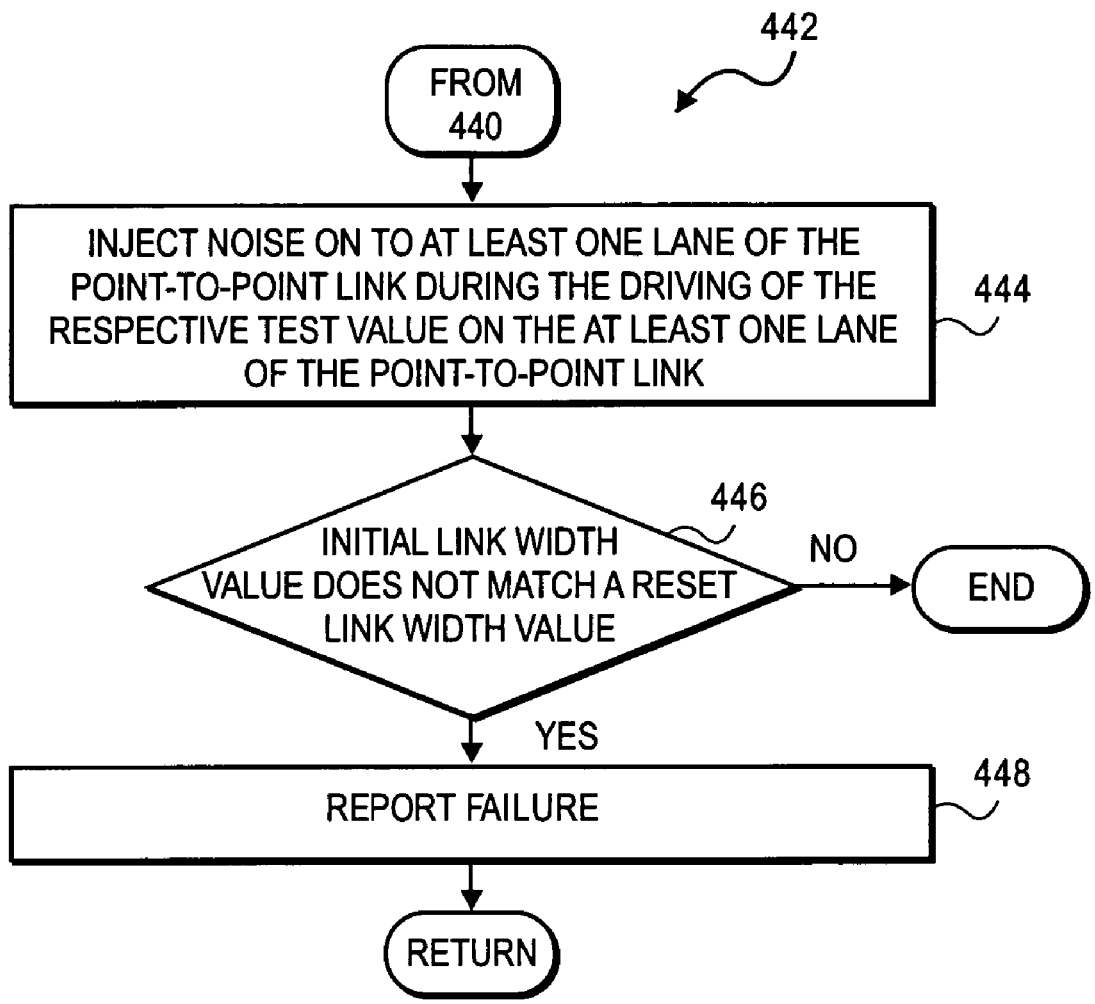
FIG. 8 is a flowchart illustrating a method for detecting a lane break condition according to a link width value, in accordance with one embodiment.

Turning now to FIG. 7, the particular methods associated with various embodiments are described in terms of computer software and hardware with reference to a flowchart. The methods to be performed by a computing device (e.g., an endpoint/link controller) may constitute state machines or computer programs made up of computer-executable instructions. The computer-executable instructions may be written in a computer program and programming language or embodied in firmware logic. If written in a programming language conforming to a recognized standard, such instructions can be executed in a variety of hardware platforms and for interface to a variety of operating systems.

In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 7 is a flowchart illustrating a method 400 for subjecting initialization of a point-to-point link to lane break/degradation conditions, in accordance with one embodiment. In the embodiments described, examples of the described embodiments will be made with reference to FIGS. 1-6. However, the described embodiments should not be limited to the examples provided to limit the scope provided by the appended claims.

Referring again to FIG. 7 at process block 402, one or more initial link values are determined for a point-to-point link following link training of the point-to-point link. During link initialization and training transmitter and receiver lane pairs may exchange training sequence ordered sets for bit alignment and symbol alignment and to exchange physical parameters. During a configuration state, link width and lane ordering may be established as part of a configuration state. Following such configuration state, the normal or L0 operating state is entered. In one embodiment, the L0 operating state is used to determine an expected behavior of the link. In one embodiment, an initial link training value may be read from a link initialization value register such as, for example, a configuration and status register.

At process block 404, a respective test value may be selected for one or more lanes of a point-to-point link according to an initial link width value. At process block 406, at least one respective test value is driven on at least one lane of the link during retraining of the link in response to the link reset. At process block 410, the link may be forced to reset resulting in retraining of the link. At process block 430, it is determined whether an initial link training value (expected behavior) matches a corresponding link training value (actual behavior) following retraining of the link in response to the reset. When the values do not match, at process block 440, a lane break condition is detected and the failure is reported.

In one embodiment, to detect the lane break condition of process block 440, the behavior of the link (while retraining during the driving of the lane break/designation values) provides a measure of the actual behavior of the link. In one embodiment, an initial link width value provides an indication of the expected link behavior. In one embodiment, a reset link width value is read from at least one link register following retraining of the point-to-point link. Hence, a lane break condition is detected if the initial link width value does not match a reset link width value.

Figure 9:
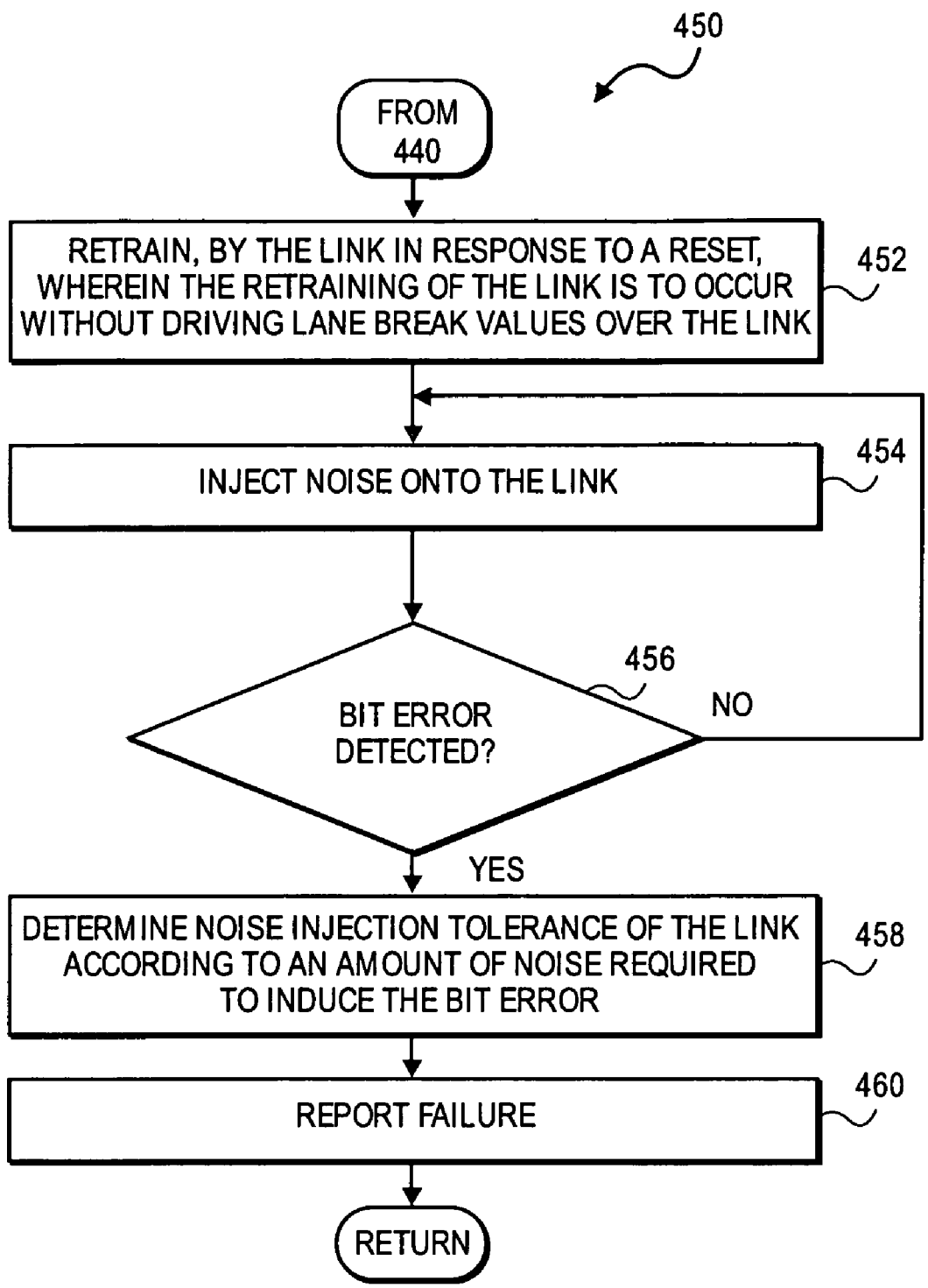
FIG. 9 is a flowchart illustrating a method for determining a lane degradation tolerance at the link, in accordance with one embodiment.

FIG. 9 is a flowchart illustrating a method 450 for detecting a lane degradation condition, according to one embodiment. In one embodiment, the link is forced to retrain in response to reset and without out the driving of the lane break/degradation values on at least one lane of the point-to-point link. At process block 484, noise is injected onto at least one lane of the point-to-point link once the point-to-point link has completed retraining and operates according to an L0 or normal operation state. At process block 456, it is determined whether a bit error is detected over the link. In one embodiment, at process block 458, if a bit error is detected over the point-to-point link, a lane degradation condition is detected. In one embodiment, an amount of noise required to induce the bit error is quantified to provide a noise/degradation tolerance of the link at process block 580. At process block 460, the noise injection/degradation tolerance of the link is reported.

Although an initial training/configuration value is described with reference to a link width value, which is negotiated during a configuration state of the point-to-point link, the expected behavior of the link is determined during initial link training. In one embodiment, initial link training is performed in the absence of emulated lane break/degradation conditions. During subsequent retraining of the link in response to the link reset, an actual behavior of the link may be determined according to a behavior of link during the retraining, namely lanes of the link are driven with lane break/degradation values during the link retraining to emulate operation of the link under lane break/degradation conditions. Various lanes can then be broken and the actual behavior compared to the expected behavior to determine product compliance to design behavior.

FIG. 9 is a flowchart illustrating a method 450 for determining a noise injection tolerance of a point-to-point link according to one embodiment. At process block 452, the link is forced to retrain in response to a reset. As the embodiment illustrated, link retraining occurs without the driving of lane break values over the link. Following retraining of the link, the link operates according to an L0 or normal operation state. At process block 454, noise is injected onto the link during operation according to the L0 state. At process block 456, it is determined whether a bit error is detected over the link. If a link error is not detected over the link, process block 454 is repeated by increasing the noise that is injected onto the link. Once a bit error is detected, at process block 458 the amount of noise injection tolerance of the link is determined according to the amount of noise required to induce the bit error.

As shown in FIG. 9, once an injected noise causes at least one bit error over the link a lane degradation condition is detected and the failure is reported to process block 460. As indicated above in one embodiment, noise injection tolerance reduces the parameter indicating the relative electric health of the link. In one embodiment, the relative electric health of the link may refer to the quality of a receiver eye for the link that is determined by, for example, data detect logic 127 as shown in FIG. 2. Accordingly, in one embodiment, an amount noise required to induce or cause a bit error is quantified to determine the noise injection tolerance of the link. For example, noise injection tolerance of the link indicates that the link is operating at a just above failing level if the amount of noise injected onto the link is required to induce bit errors is less than a predetermined amount. Conversely, if the amount of noise must be injected onto the link to cause errors is greater than a predetermined amount the noise injection tolerance of the link may be identified as robust since a large amount of noise injection amplitude is required to induce a bit error over the link. As described therein the noise injection tolerance may alternatively be referred to as a degradation condition tolerance of the link or noise injection tolerance of the link.

Figure 10:
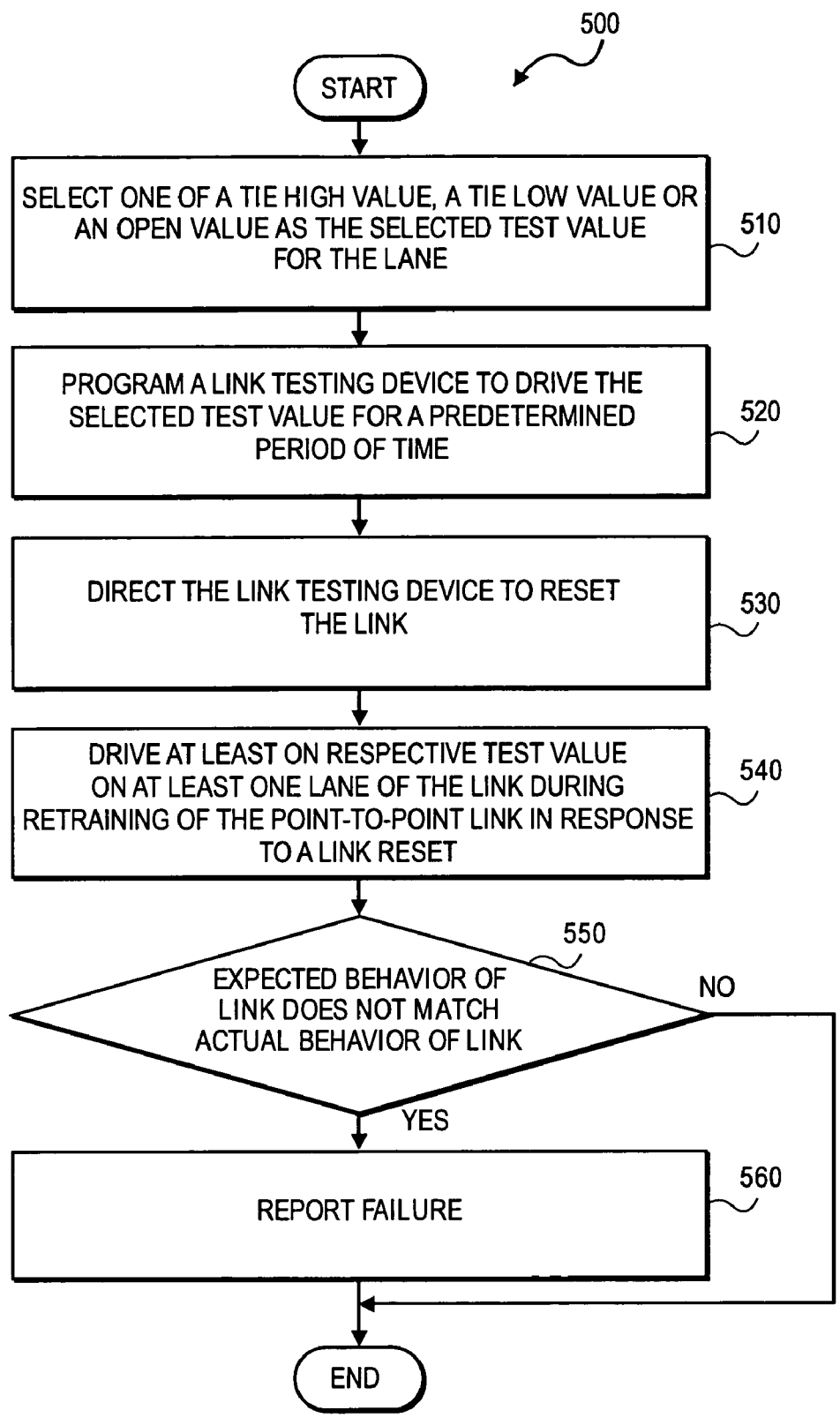
FIG. 10 is a flowchart illustrating a method for performing link testing using link test logic, in accordance with one embodiment.

FIG. 10 is a flowchart illustrating a method 500 for operating a link test device to subject link training and initialization of a point-to-point link to lane break and degradation conditions according to one embodiment. At process block 510, one of a tie high, tie low and an open value is selected as a test value for at least one lane of the point-to-point link. At process block 520, a link testing device is programmed to drive the selected test value for a predetermined period of time on the lane of the point-to-point link. At process block 530, the link testing device is directed to reset the link. At process block 540, an expected link training value is compared to an actual link training value which is determined following retraining of the link in response to the link reset. At process block 550, it is determined whether the expected link training value matches the actual link training value. At process block 440, a lane break/degradation condition is detected if the expected link training value does not match the actual link training value following retraining of the link in response to the link reset.

Current original equipment manufacturer (OEM) validation of point-to-point links is very limited and mostly restricted to manual methods to test lane break/degradation scenarios. Due to the total number of possible scenarios in the manual means, it is often difficult to close current validation holes due to the limited means of testing. Accordingly, one embodiment of the link test logic 200 as shown in FIGS. 1-6 provides better coverage to automated link testing under lane break/degradation conditions. In one embodiment, the link test logic 200 may be embodied in several physical boards skews including an ×1 mail blade with an ×16 add-in card slot; an ×2 mail blade with an ×16 add-in card slot; an ×4 mail blade with an ×16 add-in card slot; an ×8 mail blade with an ×16 add-in card slot; and an ×16 mail blade with an ×16 add-in card slot, each of the physical boards skews including mechanical support for a standard test card form factor.

FIG. 11 is a block diagram illustrating a computer system according to any of the above described embodiments including a multi-core processor having an embedded memory controller according to one embodiment. FIG. 11 illustrates a memory controller 652 (which represents any of previously mentioned memory controllers) is included in a chip 650, which also includes one or more processor cores 654. an input/output controller chip 656 is coupled to chip 650 and is also coupled to wireless transmitter and receiver circuitry 658

FIG. 12 is a block diagram illustrating a computer system according to any of the above described embodiments including a hub chip having a memory controller according to one embodiment. In FIG. 12, memory controller 652 is included in a chip 674, which may be a hub chip. Chip 674 is coupled between a chip 670 (which includes one or more processor cores 672) and an input/output controller chip 678. Input/output controller chip 678 is coupled to wireless transmitter and receiver circuitry 658.

Figure 13:
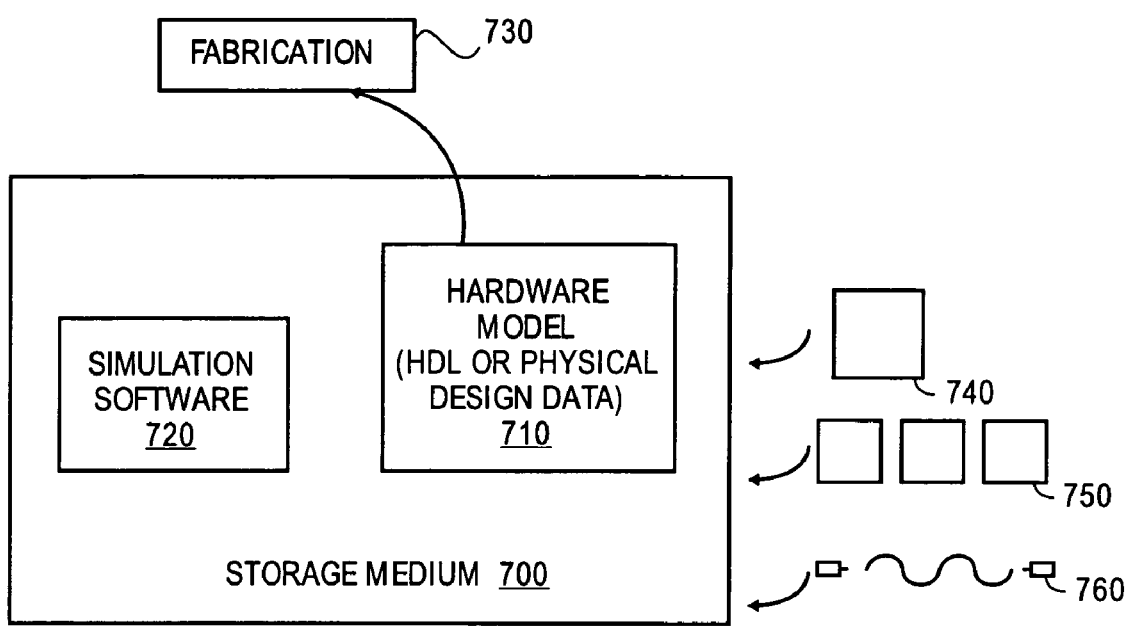
FIG. 13 is a block diagram illustrating various design representations for formats for simulation, emulation and fabrication of a design using the disclosed techniques.

FIG. 13 is a block diagram illustrating various representations or formats for simulation, emulation and fabrication 730 of a design using the disclosed techniques. Data representing a design may represent the design in a number of manners. First, as is useful in simulations, the hardware may be represented using a hardware description language, or another functional description language, which essentially provides a computerized model of how the designed hardware is expected to perform. The hardware model 710 may be stored in a storage medium 700, such as a computer memory, so that the model may be simulated using simulation software 720 that applies a particular test suite 730 to the hardware model to determine if it indeed functions as intended. In some embodiments, the simulation software is not recorded, captured or contained in the medium.

In any representation of the design, the data may be stored in any form of a machine readable medium. An optical or electrical wave 760 modulated or otherwise generated to transport such information, a memory 750 or a magnetic or optical storage 740, such as a disk, may be the machine readable medium. Any of these mediums amy carry the design information. The term "carry" (e.g., a machine readable medium carrying information) thus covers information stored on a storage device or information encoded or modulated into or onto a carrier wave. The set of bits describing the design or a particular of the design are (when embodied in a machine readable medium, such as a carrier or storage medium) an article that may be sealed in and out of itself, or used by others for further design or fabrication.

It will be appreciated that, for other embodiments, a different system configuration may be used. For example, while the system 100 includes a single CPU 102, for other embodiments, a multiprocessor system or a multi-core chip multiprocessor (CMP) system (where one or more processors cores may be similar in configuration and operation to the CPU 102 described above) may benefit from the lane break/degradation test of point-to-point links of various embodiments. Further different type of system or different type of computer system such as, for example, a server, a workstation, a desktop computer system, a gaming system, an embedded computer system, a blade server, etc., may be used for other embodiments.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments described may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

Having disclosed exemplary embodiments and the best mode, modifications and variations may be made to the disclosed embodiments while remaining within the scope of the embodiments, as defined by the following claims.

What is claimed is:

1. An apparatus, comprising:
   a controller to drive a selected test value on at least one lane of a point-to-point link, during retraining of the link in response to a link reset, and to detect a lane break condition if at least one initial link training value does not match a corresponding link training value following the retraining of the link in response to the link reset; and
   noise injection logic to inject noise into at least one lane of the point-to-point link during operation of the point-to-point link according to a normal L0 operation state and until at least one bit error is detected over the link to determine one of a noise injection tolerance and a degradation tolerance of the link.

2. The apparatus of claim 1, wherein the controller further comprises:
   a logic device to drive one of a selected tie high value, a tie low value and an open value as the selected test value for the lane.

3. The apparatus of claim 1, wherein the controller is further to detect the lane break condition if an initial link width value does not match a reset link width value read from at least one link width register following the retraining of the point-to-point link.

4. The apparatus of claim 1, wherein, the controller is a plug in card, the controller to plug in between a root complex and an end-point device.

5. A system comprises:
   a processor;
   a chipset coupled to the processor, the chipset comprising:
      an input/output (I/O) hub, including a link controller to couple an end-point device to the chipset via an interconnect;
      a test plug in card coupled between the end-point and the chipset, the card including a controller to drive a selected test value on at least one lane of the interconnect during retraining of the interconnect in response to a reset and to detect a lane break condition if at least one initial link training value does not match a corresponding link training value following retraining of the interconnect in response to the reset; and
   a wireless transmitter and receiver circuitry coupled to the chipset.

6. The system of claim 5, wherein controller further comprises:
   a logic device to drive one of a selected tie high value, a tie low value and an open value as the selected test value for the lane.

7. The system of claim 5, wherein the controller further comprises:
   noise injection logic to injecting noise on to at least one lane of the interconnect during the driving of the respective test value on the at least one lane of the interconnect.

8. The system of claim 5, wherein the processor further comprises:
   a memory controller coupled to a memory.

9. The system of claim 5, wherein the chipset further comprises:
   a memory controller coupled to a memory.

10. A method comprising:
    driving a selected test value on at least one lane of a point-to-point link;
    causing the point-to-point link to reset;
    detecting, during retraining of the link in response to the link reset, a lane break condition if at least one initial link training value does not match a corresponding link training value following the retraining of the link in response to the reset;
    retraining, by the point-to-point link in response to a reset, wherein the retraining of the link is to occur without out the driving of lane break/degradation values on the lanes at the point-to-point link; and
    injecting noise onto at least one lane of the point-to-point link during the operation of the point-to-point link according to a normal L0 operation state; and
    repeating the injecting of the noise until at least one bit error is detected over the link to determine one of a noise injection tolerance and a degradation tolerance of the link.

11. The method of claim 10, wherein driving the selected test value further comprises:
    selecting one of a tie high value, a tie low value and an open value as the selected test value for the lane;
    programming a link testing device to drive the selected test value for a predetermined period of time; and
    directing the link testing device to reset the link.

12. The method of claim 10, wherein causing the point-to-point link to reset further comprises:
    retraining, by the link, in response to the reset, wherein the retraining of the link occurs during the driving of the test value.

13. The method of claim 10, wherein detecting the lane break condition further comprises:
- determining an initial link width value of the link;
- selecting a respective test value for each lane of the point-to-point link according to the initial link width value;
- retraining, by the link in response to the reset, wherein the retraining of the link is to occur during the driving of the selected test value; and
- detecting the lane break condition if the initial link width value does not match a reset link width value read from at least one link width register following the retraining of the point-to-point link.

14. An article of manufacture having a computer readable storage medium including associated data, wherein the data, when executed, results in the computer performing:
- determining an initial link width value of a point-to-point link following link training of the point-to-point link;
- selecting a respective test value for one or more lanes of the point-to-point link according to a link width value;
- driving at least one respective test value on at least one lane of the link during retraining of the point-to-point link in response to a reset;
- comparing at least one initial link training value to a corresponding link training value following the retraining of the link in response to the reset;
- injecting noise into at least one lane of the point-to-point link during the driving of the respective test value on the at least one lane of the point-to-point link;
- detecting a lane degradation condition if a bit error is detected over the link; and
- determining a noise injection/degradation tolerance of the link according to an amount of noise required to induce the bit error over the link.

15. The article of manufacture of claim 14, wherein the computer readable storage medium further comprises data, which when accessed, results in the computer further performing:
- manually setting a test card to drive the respective test value on the at least one lane of the point-to-point link.

16. The article of manufacture of claim 14, wherein the computer readable storage medium further comprises data, which when accessed, results in the computer further performing:
- retraining, by the link, in response to the reset, wherein the retraining of the link is to occur during the driving of the selected test value; and
- detecting the lane break condition if the initial link width value does not match a reset link width value read from at least one link width register following the retraining of the point-to-point link.

17. The article of manufacture of claim 14, wherein the computer readable storage medium further comprises data, which when accessed, results in the computer further performing:
- retraining, by the point-to-point link in response to a reset, wherein the retraining of the link is to occur without out driving of lane break/degradation values over the link; and
- injecting noise onto at least one lane of the point-to-point link during the operation of the point-to-point link according to a normal L0 operation state; and
- repeating the injecting of the noise onto the link until at least one bit error is detected over the link to determine one of a noise injection tolerance and a degradation tolerance of the link.

* * * * *